US007033450B2

(12) United States Patent
Salvestro

(10) Patent No.: US 7,033,450 B2
(45) Date of Patent: Apr. 25, 2006

(54) FLEXOGRAPHIC PRINTING METHOD

(75) Inventor: Aldo Salvestro, Burnaby (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 55 days.

(21) Appl. No.: 10/739,057

(22) Filed: Dec. 19, 2003

(65) Prior Publication Data

US 2004/0129383 A1 Jul. 8, 2004

Related U.S. Application Data

(63) Continuation-in-part of application No. 10/271,991, filed on Oct. 17, 2002, now abandoned.

(51) Int. Cl.
*B32B 38/10* (2006.01)
*B32B 43/00* (2006.01)

(52) U.S. Cl. ........................ 156/64; 156/196; 101/486; 101/463.1

(58) Field of Classification Search .................. 156/64, 156/190, 196, 203, 215, 217, 250, 258, 277, 156/304.1, 304.2; 430/300, 306; 101/375, 101/376, 401.1, 401.3, 481, 486, 494, 463.1, 101/DIG. 36
See application file for complete search history.

(56) References Cited

U.S. PATENT DOCUMENTS 6,312,871 B1 11/2001 Cusdin et al.
2002/0025492 A1 2/2002 Murphy et al.
2003/0053138 A1 3/2003 Klein et al.

FOREIGN PATENT DOCUMENTS

EP 1081458 A2 * 3/2001

* cited by examiner

*Primary Examiner*—Chris Fiorilla
*Assistant Examiner*—Sing P. Chan
(74) *Attorney, Agent, or Firm*—Donna P. Suchy

(57) ABSTRACT

An imaging engine for preparing a flexographic printing precursor that is to be printed in lane sections or with a staggered seam is equipped with an edge detection system for determining the location of seams between abutting precursor sections.

14 Claims, 6 Drawing Sheets

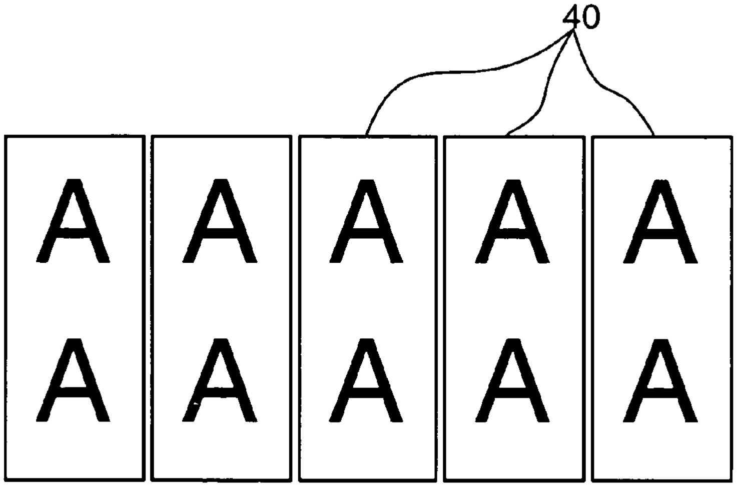
FIG. 1-A
Prior Art
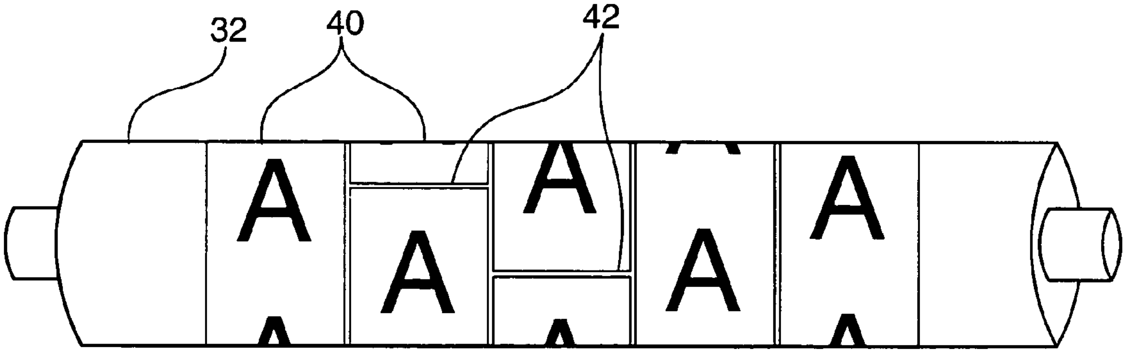
FIG. 1-B
Prior Art

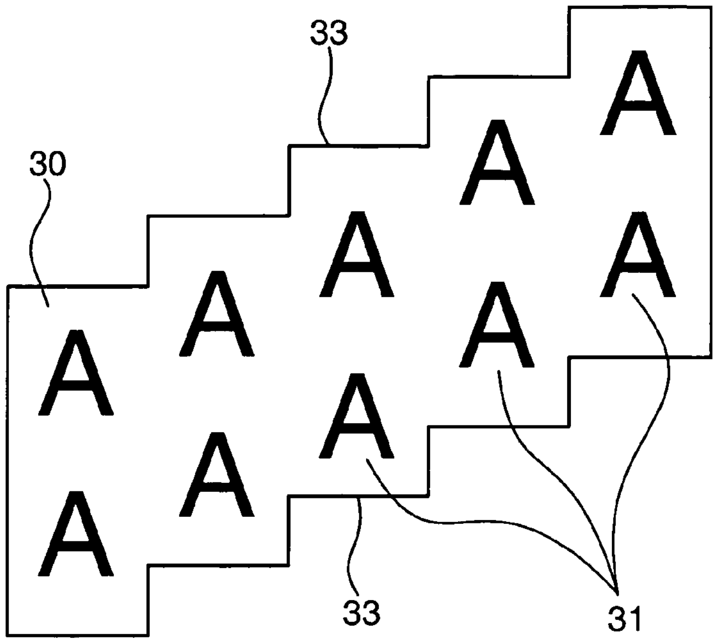
FIG. 1-C
Prior Art
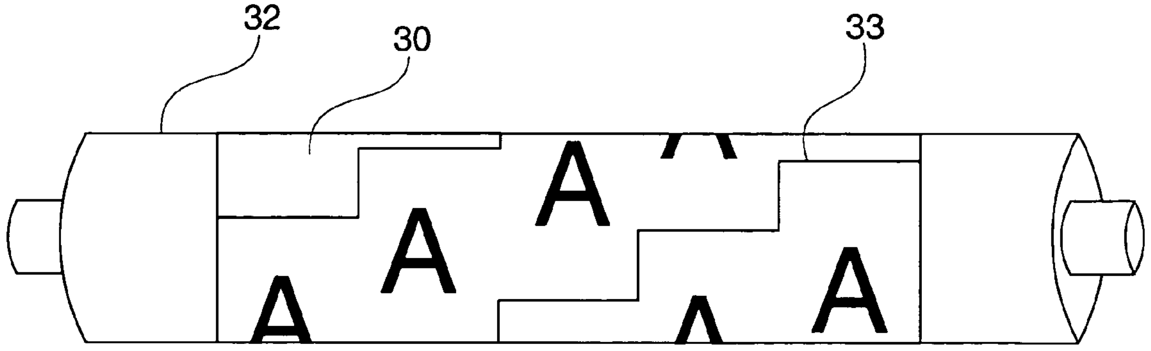
FIG. 1-D
Prior Art

FLEXOGRAPHIC PRINTING METHOD

RELATED APPLICATIONS

This is a continuation-in-part of U.S. application Ser. No. 10/271,991 filed on Oct. 17, 2002 now abandoned entitled "Flexographic printing method".

TECHNICAL FIELD

This invention relates to flexographic printing, and more specifically to an improved process for preparing flexographic printing sleeves.

BACKGROUND

Flexographic printing is a method of direct rotary printing that uses resilient relief image plates. The plates are typically made of rubber or photopolymer. Flexographic printing has found particular application in packaging where it has displaced rotogravure and offset lithography printing techniques in many cases. While flexographic printing can produce high quality printed products, making flexographic printing formes according to prior art processes can be undesirably time consuming and labor intensive.

Typical conventional flexographic plates have a flat polyester base coated with a photopolymer layer. The photopolymer layer is sensitive to ultraviolet (UV) radiation, such that it hardens when exposed to UV light. In a first step, a floor is set by exposing the back of the plate to UV light. The floor forms the base of the relief that will be formed in further imaging steps. A film mask, which is imaged in a separate process, is placed over the top of the photopolymer layer, and drawn down by a vacuum frame to ensure good contact. The photopolymer layer is then flood exposed to UV light, thereby hardening or cross-linking the regions of the photopolymer layer not covered by the mask. The mask is then removed and the plate is processed in solvents to remove the unexposed areas of the photopolymer layer (which were covered by the mask) thus forming a printing image. After processing with solvents the plate is dried. Drying may take several hours.

Digital flexography follows a similar process except that the plate has an integral UV-opaque mask layer coated over the photopolymer layer. The mask layer is selectively ablated by a digital imager with a high-power laser imaging head to form an image mask that is opaque to UV light in non-ablated areas. Once the mask is formed, processing of the plate continues as it would for conventional flexographic plates except that there is no need to use a vacuum frame to ensure good contact between the mask and photopolymer layer since the mask layer is integral with the photopolymer layer. Other flexographic plate formulations, such as Cyrel® Fast made by E. I. Dupont de Nemours and Company, eliminate the use of solvents for the processing step and reduce the combined processing and drying time.

The processed flexographic plate is then mounted on a flexographic press cylinder using an adhesive layer such as a double sided adhesive tape or foam. The imaged plate must be mounted in precise registration on the cylinder. This is done using mechanical and/or electronic aids. Accurate registration is key in producing a high quality printed product. Mounting is typically done by skilled operators.

When a rectangular flexographic plate is mounted on a press cylinder there is a gap or "seam" where the top and bottom of the plate approach one another. On the printing press, the printing stock is backed up by an impression cylinder. The impression cylinder presses the printing stock into contact with the flexographic relief plate mounted on the press cylinder. The impression cylinder sets a contact pressure for the printing operation. Since the seam contacts the impression cylinder on each rotation, the discontinuity jolts the impression cylinder slightly, a phenomenon known as "press bounce" or "cylinder bounce". This jolt puts an upper limit on the impression speed, beyond which registration and other printing errors may occur.

A common method of reducing the effects of cylinder bounce is to stagger the seam around the cylinder. This method is particularly effective when a repeated pattern is imaged across the cylinder; a common situation in flexographic printing. The plates are arranged so that the impression cylinder is always contacting a relief image and does not fall into a seam. A staggered seam can be achieved by laying out the image so that several plate sections are applied to the cylinder in what are known as "lanes". In FIG. 1-A a number of plate sections 40 have been cut and imaged and in FIG. 1-B plate sections 40 are shown wrapped around a cylinder 32. Each seam 42 is offset from the seams of other lanes so that they are distributed around the circumference of the cylinder. Consequently the impression cylinder no longer falls into a seam since it is always riding on the image relief of one or more lanes.

A staggered seam may also be achieved by cutting the plate seam in a staircase shape. FIG. 1-C shows a photopolymer plate 30 cut with a staircase seam 33. The seam layout has the same repeat as the image elements 31. In FIG. 1-D plate 30 is shown wrapped around cylinder 32. The location of seam 33 is chosen so that the plate completely wraps around the cylinder with the seams precisely lining up.

While a staggered seam is effective in reducing the effects of cylinder bounce, the manual cutting, mounting, and registration of the plates on the press cylinder is both time consuming and may not provide the accuracy required for high quality printing.

To avoid registration problems, the mask layer may be imaged after mounting the plate on the cylinder. In this way, the registration is provided by the imaging device, which can place an image very accurately. The UV exposure and processing of a plate imaged while on a cylinder in this manner requires specialized equipment, now commonly available, that can operate on round cylinders rather than flat plates.

In order to make the handling of cylindrical photopolymer plates more convenient, sleeve substrates have been developed. A sleeve substrate typically comprises a cylindrical tube of nickel, polyester or some other material. The sleeve substrate material is chosen to have a certain degree of elasticity so that air pressure can be used to expand the sleeve slightly, thus allowing it to be slid over a cylinder on a cushion of air. Once the air supply is removed, the sleeve substrate shrinks so that it is held tightly in place. A photopolymer plate, referred to herein as a "flexographic printing precursor", may be mounted on the sleeve substrate using double-sided tape in the same way flat plates are mounted on a cylinder. The cut photopolymer plate is wrapped around the sleeve in approximate registration and then imaged on a digital imager to produce a flexographic printing forme, which is then ready to be placed on a printing cylinder for use in a flexographic printing operation. This process employing a sleeve substrate as a base for mounting a flat plate is known in the industry as Plate-on-Sleeve (PoS).

FIG. 2 shows a flow diagram of a prior art process for making a typical PoS flexographic printing forme. A flexographic printing precursor 1 comprising a photoplymer layer and a UV opaque mask layer is back exposed in step 2 to set a floor for the relief image. In step 3 the flexographic printing precursor is cut into sections so that it can be applied to a sleeve substrate in lanes to form a staggered seam. The flexographic printing precursor sections are then mounted on a sleeve substrate using double-sided tape in step 4 to produce a flexographic printing sleeve. Registration of the flexographic printing precursor sections must be accurate enough to ensure that the image will not run into a seam, but since the flexographic printing sleeve is not yet imaged, the accuracy required is significantly reduced. Alternatively, the flexographic printing precursor may be cut to form a section with a staggered seam as shown in FIG. 1-C and mounted as a single piece to a sleeve substrate in step 4.

Referring again to FIG. 2 image data 7 is typically pre-formatted by one or more computer workstations connected to a network to enable file or data transfer. A packaging workflow system 5 and a controller 6 combine to layout an image including the details of how it will be imaged and printed. These workstations provide functionality enabling an operator to take an image file from a customer and arrange the image for optimal printing.

The UV opaque mask layer is then ablated in a digital imager 8 according to the image data 7. The flexographic printing sleeve is then exposed to UV light in step 9, hardening or cross-linking areas where the UV opaque mask layer has been ablated. A processing step 10 follows. Processing may include washing in solvents, drying, and a final UV exposure to fully harden the photopolymer and remove tackiness. The finished photopolymer printing forme 11 is then ready for printing on a flexographic press.

Direct engraving of flexographic plates is also known in the art. Typically a high power laser is used to remove the unwanted material thus forming a relief image. In U.S. Pat. No. 5,416,298 to Robert an apparatus for preparing a printing medium for use in a printing process uses a laser beam to directly engrave the medium. The printing medium may include a printing cylinder for a flexographic printing process. The patent describes an acousto-optic modulator for deflecting the beam over the surface of the medium being engraved.

Digital imaging devices for imaging such flexographic printing sleeves are typically built in the general form of a lathe. Such machines have a mandrel on which a flexographic printing sleeve can be mounted, a fixed headstock for driving the flexographic printing sleeve, a moveable tailstock for supporting the flexographic printing sleeve, and a traveling imaging head. The imaging head typically has a radiation source, such as a laser, capable of imagewise ablating the mask layer.

It is desirable that the overall time required to make a flexographic printing forme be reduced.

SUMMARY OF THE INVENTION

In a first aspect of the present invention a method for preparing a flexographic printing forme involves attaching one or more sections of flexographic printing precursor to an imaging drum such that there is at least one seam. The location of the seam is then detected and an image is formed on the one or more sections, the image being located in aligned relation to the detected location of the seam.

In another aspect of the present invention an apparatus for imaging a flexographic printing precursor comprises an imaging drum for securing one or more sections of flexographic printing precursor thereto such that there is at least one seam. The apparatus further comprises an imaging head for exposing the one or more sections of flexographic printing precursor and an edge detection system for establishing the location of the seam.

For an understanding of the invention, reference will now be made by way of example to a following detailed description in conjunction with the accompanying drawings.

BRIEF DESCRIPTION OF THE DRAWINGS

In drawings which illustrate by way of example only preferred embodiments of the invention:

FIG. 1-A is a depiction of a prior art flat flexographic printing plate cut into lanes;

FIG. 1-B is a depiction of a prior art flexographic printing plate mounted on a printing cylinder in lanes with staggered seams;

FIG. 1-C is a depiction of a prior art flat flexographic printing plate cut with a staircase seam;

FIG. 1-D is a depiction of a prior art flexographic printing plate with a staircase seam wrapped around a printing cylinder;

DESCRIPTION

Figure 2:
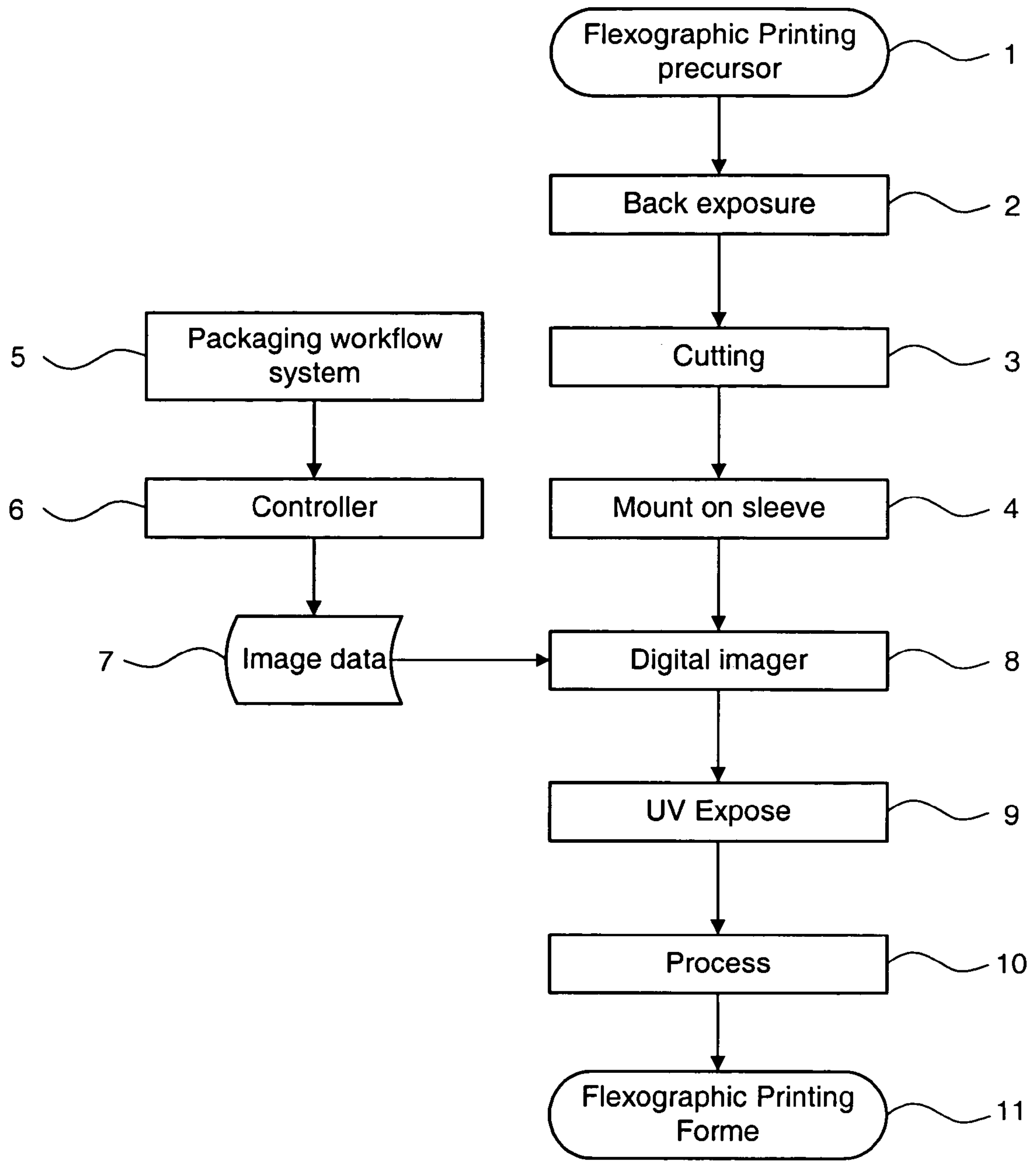
FIG. 2 Prior Art
FIG. 2 is a flowchart illustrating a prior art process for making a flexographic printing forme.
Figure 3:
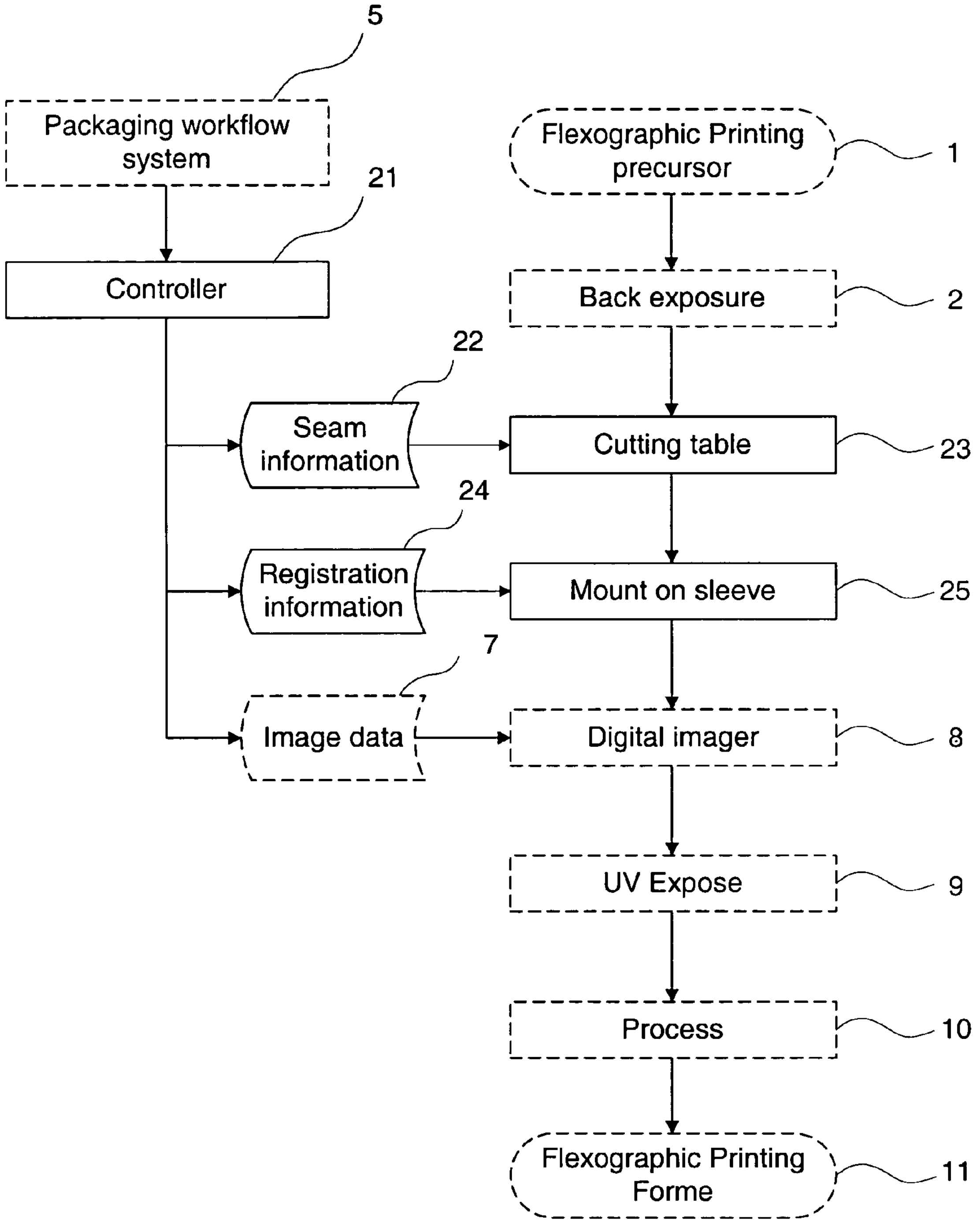
FIG. 3 is a flowchart illustrating an improved method according to this invention.

FIG. 3 is a flowchart illustrating an embodiment of the present invention. The invention provides automatic methods and apparatus for producing flexographic printing sleeves. The items drawn in broken lines in FIG. 3 are not directly applicable to the present invention but are included to show the context of the methods of the present invention in the overall process of making a flexographic printing forme.

FIG. 3 shows a controller 21, which may comprise a software program running on a computer workstation. Controller 21 is connected via a network or some other data connection to a digital imager 8. Controller 21 facilitates the interactive arrangement of sections of flexographic printing precursor on a sleeve substrate to produce a desired seam layout for the resulting flexographic printing sleeve. Controller 21 comprises a display such as a computer workstation monitor. An operator is able to view a facsimile of the printing image on the display. Software running in controller 21 allows an operator to define a desired seam layout. The operator can use an input device, such as a mouse, light pen, trackball, touch-sensitive screen or the like to draw in seams to create an arrangement of one or more sections of flexographic printing precursor. Controller 21 may additionally be programmed with functionality to aid the operator by suggesting a seam layout calculated according to an algorithm set to minimize plate wastage or some other optimization function. The seam layout may comprise, for example, a number of lanes or a staircase seam.

Once the seam layout has been designated, controller 21 transfers seam location information 22 to a controllable cutting device 23. Device 23 cuts the flexographic printing precursor into one or more sections according to the seam location information provided to it by controller 21. The cuts could divide the flexographic printing precursor into simple rectangular sections, could provide a staggered seam, or could provide a more complex seam layout.

Controller 21 may implement a packaging workflow system 5 that controls the process of converting image copy into flexographic printing formes. An example of such a packaging workflow system is Prinergy Powerpack™ sold by Creo Inc of Burnaby, British Columbia, Canada. Prinergy Powerpack is a fully integrated and automated workflow management system designed specifically to meet the needs of offset and flexographic converters. Controller 21 may comprise any combination of one or more data processors and may be a stand-alone device or connected together with other devices in a computer network. Information or data transfer can be accomplished in a variety of manners and this application should be understood to cover any means of file or data transfer via any form of data storage or transmission. The term "information" used in reference to seam location includes any form of data or encoding that can be used to transfer seam layout details between process steps.

Figure 4:
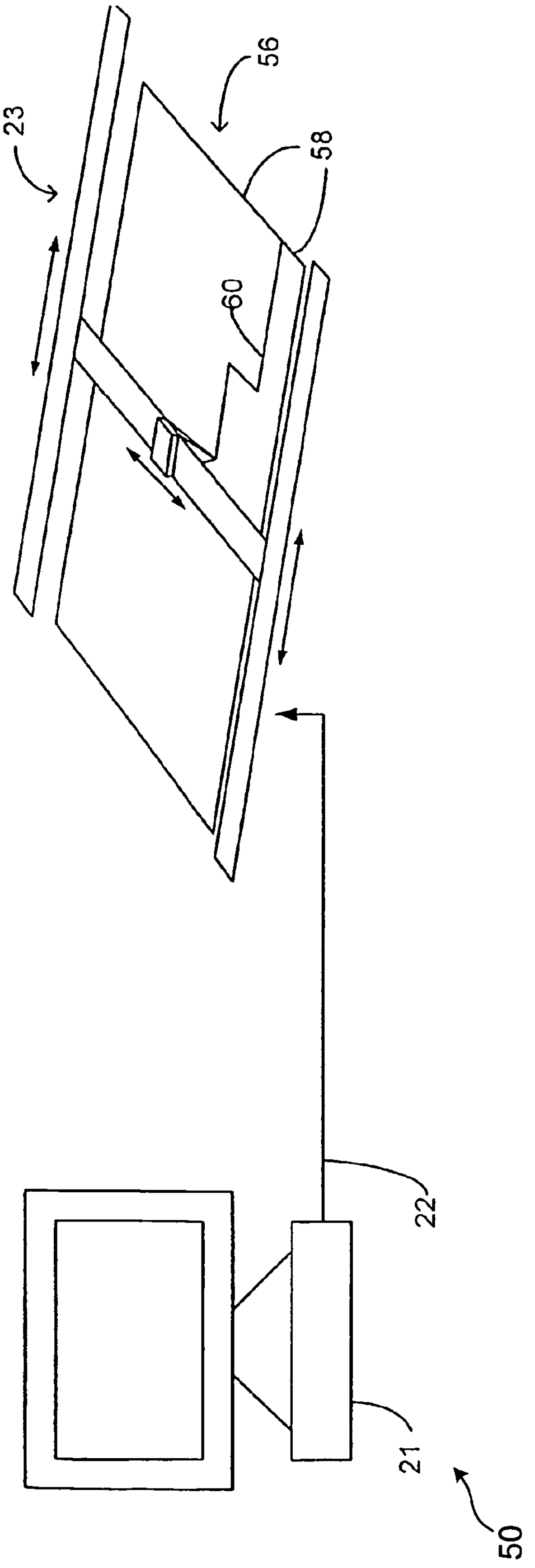
FIG. 4 is a schematic depiction of apparatus according to the invention.

FIG. 4 schematically depicts apparatus 50 comprising a controller 21 and a cutting device 23. Controller 21 may comprise an interactive user interface which allows an operator (not shown) to designate an arrangement of sections of flexographic printing precursor on a sleeve substrate. Controller 21 provides seam information 22 to cutting device 23 based on the arrangement designated by the operator.

Cutting device 23 is configured to cut a flexographic printing precursor plate 56 into sections 58 according to seam information 22. A suitable controllable cutting device 23 is produced by Misomex International of Nashua, N.H. Misomex have a range of flatbed x-y plotting machines with cutting heads available. Such machines are capable of quickly and accurately cutting many types of material. The flexographic printing precursor can be cut with a plate protective layer intact or removed depending on the user's preference. Any cutting device capable of cutting a flexographic printing precursor in accordance with seam information 22 provided by controller 21 could be used in this invention. In the FIG. 4 embodiment, cutting device 23 is shown cutting a staircase seam 60. Cutting device 23 does not have to be a flatbed device; the plate could also be cut on a cylinder. Additionally, some cutting devices are available with a pen plotter head that may be used to place a reference indicia or a reference numeral on the precursor sections. The reference indicia can be used in a later step to align the precursor to the substrate during mounting. Reference numerals may be used to uniquely identify precursor sections to avoid later confusion.

It is well known to use a mounting device to apply flexographic printing precursor to sleeves or cylinders. The Cyrel® Microflex Premounter is an example of such a device (the device is sold for DuPont by Alliance Services Group). The mounting device is used to precisely mount precursor onto a sleeve prior to imaging. The sleeve is rotatably mounted in the device and a table system with moveable precursor guides aligns the precursor in relation to the sleeve. The precursor is then adhered to the sleeve in correct alignment by sliding it off the table into contact with the sleeve. Such devices feature varying levels of automation and some even accept indexing data defining the intended position of the precursor on the sleeve.

The sleeve with the precursor sections applied is then ready for imaging and may be transferred to an imaging engine. An imaging engine 70, shown in FIG. 6, comprises a rotatable drum 72 and an imaging head 74. Drum 72 has several un-imaged printing precursor sections 58 secured to its surface in lanes with staggered horizontal seams 78. Between the lanes is a vertical seam 60. The precursor sections 58 may be mounted directly on the surface of drum 72 or they may be mounted on an intermediate sleeve substrate, which is in turn mounted on the drum 72.

Imaging head 74 is equipped with edge detection hardware as described in U.S. provisional patent application 60/473127 entitled "Method and apparatus for detecting the edge of an imaging media" and incorporated herein by reference. The edge of the media is detected by directing a beam of light onto the precursor surface in the vicinity of the seam and then scanning the beam over the seam. The reflection of the beam is monitored by one or more sensors and the seam discontinuity generates corresponding discontinuities in the sensor signals. By additionally monitoring the scan position of the beam and/or the imaging head the seam may be accurately located. Many such methods of edge detection are in routine use in the platemaking industry.

A controller 76 is configured to provide seam layout information to image head 74 via an interface connection 75. In this embodiment the securing of the precursor sections 58 to the surface of drum 72 need not be extremely precise since imaging head 74 uses its edge detection capability to search for and accurately locate the actual position of seam 60 on drum 72. The seam layout information, transferred to the imaging head 74 via interface connection 75, is used by the imaging head 74 to narrow the search area. Similarly the edge detection capability of imaging head 74 may also be used to locate horizontal seams 78 to ensure correct registration of the image in the drum rotation direction.

Figure 6:
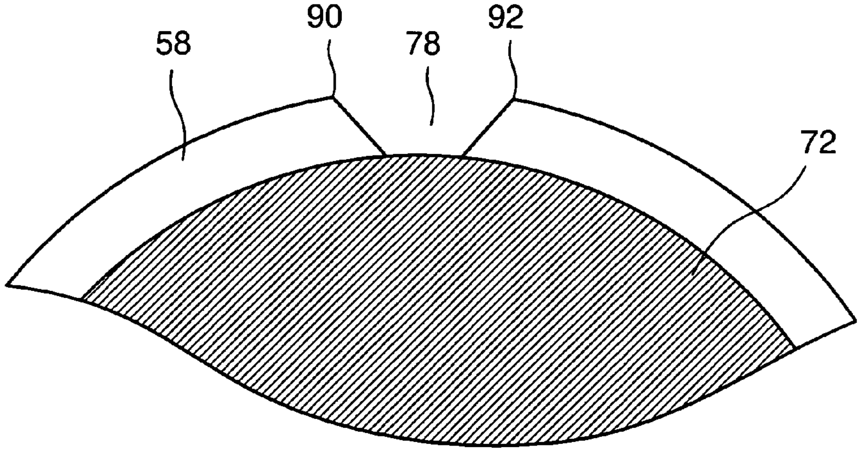
FIG. 6 is a section end view of a portion of a drum with precursor mounted thereon.

In FIG. 6 a portion of drum 72 has a flexographic precursor 58 attached thereto. A horizontal seam 78 between abutting ends of the precursor defines two edges 90 and 82. The location of seam 78 may be determined by using the edge detection system to locate edges 90 and 92. The location of the seam is then taken as the mid point between edges 90 and 92. In this way when precursor section 58 is imaged the image will be circumferentially centered on section 58.

In this application and the appended claims the term "seam" should be understood to apply to a gap between any two edges of precursor mounted on a substrate. The edges may be closely abutting or there may be a more substantial distance between the edges. While the depicted seams are shown in either circumferential or the along drum direction (aligned with the rotational axis) this is not mandated and the seam may be at any angle or may even be irregular.

Once a particular seam 78 has been accurately located, controller 76 sends image data for that particular section to the imaging head 74. Imaging head 74 then images the precursor section 58, whereafter the next seam is located and the process repeated. Alternatively the seams may all be located before any imaging commences, each seam location being stored in a memory for later use.

In some instances, particularly when a mounting device is used to mount the precursor sections, the lateral mounting accuracy may be adequate to dispense with a seam location in the lateral (along the drum) direction in which case only the horizontal seam 78 need be located.

Advantageously, in this embodiment inaccuracies in the cutting or placing of the precursor sections 58 on drum 72 are compensated for by determining the exact locations of seams 60 and/or seams 78. Images are thus always placed in correct registration on the precursor sections 58. Additionally the edge detection may be performed in a second location 80 to determine whether a particular lane is tilted, and if so whether the tilt is too large. If the precursor section has is mounted with too large a tilt, the image may no longer be able to fit on the section 58. In this case it is prudent to rather abort the imaging rather than produce an unusable precursor section.

The interface connection 75 between the imaging head 74 and the controller 76 may be any data transmission means capable of operably connecting the elements including, but not limited to, an electrical cable, an optical fiber or a free space optical connection. The connection 75 may also comprise transferring the data via storage means such as a removable computer disk or a USB memory key.

While the transfer of seam information to imaging head 74 conveniently narrows the area of search, such a transfer is not mandated by the invention. In absence of this information a wider edge search may be used to locate all the seams 60, although this search may be significantly slower. In practice, since data representing the actual images to be plotted is commonly available and an interface 75 between imaging head 74 and controller 76 usually exists for other reasons, it is convenient to use seam layout information to speed up the seam location operation.

Advantageously, for exposure heads that have auto-focusing capabilities that keep the imaging beams in focus on the precursor surface during imaging, the ability to locate the position of horizontal seams 78 is useful in avoiding possible malfunctioning of the autofocus system. An autofocus system suitable for uses in an imaging engine is described in commonly assigned U.S. Pat. No. 6,137,580 to Gelbart, incorporated herein by reference. A horizontal seam discontinuity 78 will likely present to the autofocus system as an out-of-range error since there is inevitably a discontinuity in reflection in the seam area. Prior knowledge as to the location of the seams 78 allows the focus system to be configured to ignore sensor readings in the location of the seam thus preventing a focus malfunction.

Figure 5:
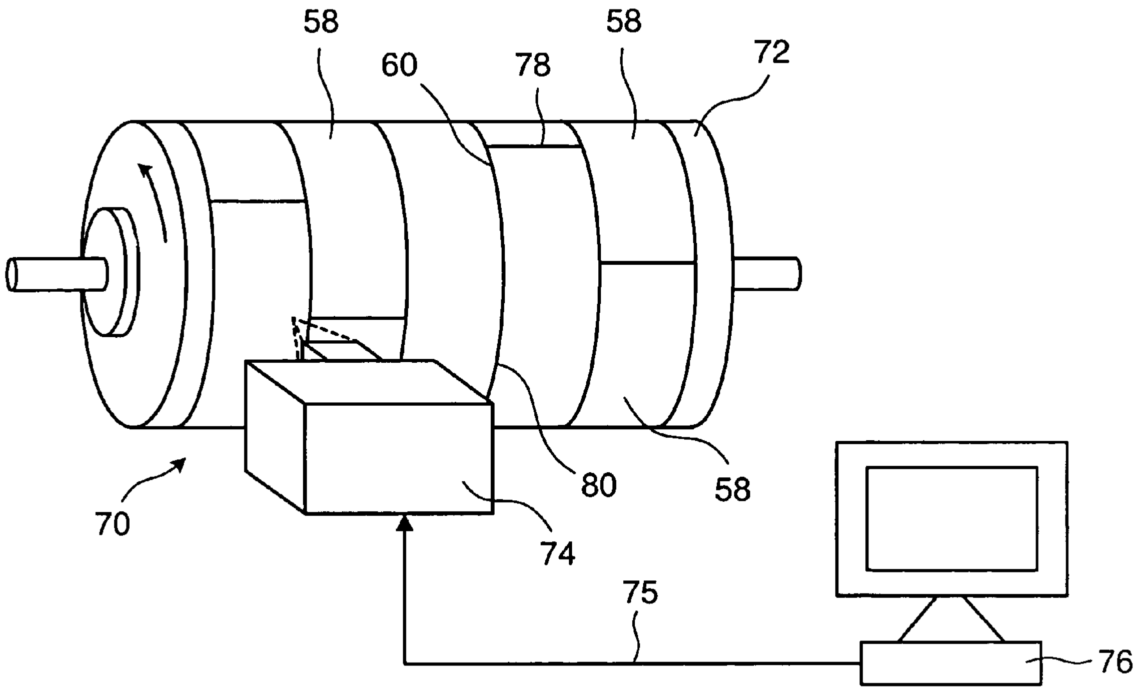
FIG. 5 is a depiction of an imaging engine in accordance with an embodiment of the invention.

It should be readily apparent that while the embodiment depicted in FIG. 6 is described in relation to precursor sections mounted in lanes, the seam location may be similarly performed on a staircase cut precursor (depicted in FIG. 5-B). Generally a staircase cut precursor is to some extent self registering but mounting inaccuracies are still possible and detecting the seam locations could still be advantageous, particularly when it is desired to form the image close to the seams. Clearly the methods of detecting the seams described herein are also equally applicable to plates that are directly engraved e.g. by a high power $CO_2$ laser.

As will be apparent to those skilled in the art in light of the foregoing disclosure, many alterations and modifications are possible in the practice of this invention without departing from the spirit or scope thereof.

What is claimed is:

1. A method for preparing a flexographic printing forme comprising:

attaching one or more sections of flexographic printing precursor to an imaging drum such that there is at least one seam wherein first and second edges of the precursor are adjacent to one another along the at least one seam;

detecting the location of the at least one seam; and, imaging the one or more sections; wherein:

detecting the location of the at least one seam comprises determining positions of both the first and second edges of the precursor; and, imaging the one or more sections comprises establishing an alignment of an image on the one or more sections based on the determined positions of both the first and second edges and forming the image, in the established alignment, on the precursor.

2. A method according to claim 1, wherein the flexographic printing precursor comprises a plurality of sections that are attached to the imaging drum in lanes.

3. A method according to claim 1, comprising attaching the one or more sections of the flexographic printing precursor to an intermediate sleeve and engaging the intermediate sleeve on the imaging drum.

4. A method according to claim 1, wherein the at least one seam is generally aligned in a circumferential direction around the drum.

5. A method according to claim 1, wherein the at least one seam is aligned along the drum in a direction generally parallel to a rotational axis of the drum.

6. A method according to claim 1, comprising detecting the seam location of the at least one seam in each of a first position and a second position, the second position spaced apart from the first position.

7. A method according to claim 6, comprising determining a tilt angle for at least one of the one or more sections of flexographic precursor, the tilt angle calculated from the detected seam locations in the first and second positions.

8. A method according to claim 1, wherein detecting the location of the at least one seam comprises monitoring a reflection of an incident beam of light while scanning the beam of light over the at least one seam.

9. A method according to claim 1, comprising receiving seam layout information indicating an approximate location for the at least one seam.

10. A method according to claim 9, wherein detecting the location of the at least one seam comprises searching for the at least one seam in only the indicated approximate location.

11. A method according to claim 1, wherein forming the image on the one or more sections comprises receiving data defining the image and determining a start position for the image in accordance with the detected scant location.

12. A method according to claim 11, comprising determining a start position for the image in accordance with a detected seam location in both of:

i) a generally circumferential direction; and ii) a direction generally parallel to a rotational axis of the drum.

13. A method according to claim 1, wherein detecting the location of the at least the one seam is performed by a controller for an apparatus for preparing a flexographic printing forme, the controller comprising:

seam detecting means for detecting the location on the flexographic printing precursor material secured to the imaging drum of the at least one seam along which first and second edges of the precursor are adjacent to one another, wherein the seam detecting means is configured to determine positions of both the first and second edges of the precursor; and, an imaging means for imaging the one or more sections, the imaging means configured to establish the alignment for the image relative to the location of the at least one seam based on the positions of the first and second edges determined by the seam detecting means and to control an imaging head to form the image on the precursor in aligned relation to the seam.

14. A method for preparing a flexographic printing forme, the method comprising:

attaching one or more sections of flexographic printing precursor to an imaging drum such that there is at least one seam;

detecting the location of the at least one seam;

forming an image on the one or more sections, the image located in aligned relation to the detected location of the at least one seam; and, configuring an autofocus system to disregard focus information generated from an area of the flexographic printing precursor in proximity to the detected seam location.

* * * * *